United States Patent
Qian et al.

(10) Patent No.: US 7,506,052 B2
(45) Date of Patent: Mar. 17, 2009

(54) NETWORK EXPERIENCE RATING SYSTEM AND METHOD

(75) Inventors: Tin Qian, Bellevue, WA (US); Alexandru Gavrilescu, Redmond, WA (US); Alvin Tan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 472 days.

(21) Appl. No.: 11/103,299

(22) Filed: Apr. 11, 2005

(65) Prior Publication Data

US 2006/0230134 A1    Oct. 12, 2006

(51) Int. Cl.
*G06F 15/16* (2006.01)
*G06F 15/173* (2006.01)

(52) U.S. Cl. .................. 709/224; 709/227

(58) Field of Classification Search ........... 709/223, 709/224, 227–229
See application file for complete search history.

(56) References Cited

U.S. PATENT DOCUMENTS 7,006,448 B1 * 2/2006 Thio ............... 370/252
2003/0093244 A1 * 5/2003 Corlett et al. ............ 702/186
2003/0233445 A1 * 12/2003 Levy et al. ............... 709/224
2006/0153089 A1 * 7/2006 Silverman ................ 370/252

OTHER PUBLICATIONS

CNET, "Bandwidth Meter," Retrieved Apr. 11, 2005 from: http://reviews.cnet.com/4002-6548_7-5118991.html.
CNET, "Bandwidth Meter speed test," Retrieved Apr. 11, 2005 from: http://reviews.cnet.com/7004-7254_7-0.html?tag=cnetfd.dir.
Gagne, Marcel, "Cooking with Linux—The Wireless Kitchen," Retrieved Apr. 11, 2005 from: http://www.marcelgagne.com/cwl092004.html.

* cited by examiner

*Primary Examiner*—Jeff Pwu
*Assistant Examiner*—Scott M Sciacca
(74) *Attorney, Agent, or Firm*—Marshall, Gerstein & Borun LLP

(57) ABSTRACT

A network experience rating system and method determines a network connection quality for a computer by monitoring characteristics of data traffic through a connection with another computer on the network. The network experience rating system statistically analyzes the characteristic data and compares the statistically analyzed data to historical data gathered for the computer. The network experience rating system thus provides a rating that is individualized for a particular computer based on the computer's network usage.

19 Claims, 8 Drawing Sheets

| Data Structure | | |
|---|---|---|
| Hop Count | Hop Count Group | Round Trip Time (ms) |
| 4 | Local | 3.7 |
| 10 | Near | 10.2 |
| 2 | Local | 2.3 |
| 3 | Local | 3.2 |
| 18 | Foreign | 15.6 |
| ⋮ | ⋮ | ⋮ |

700

800

NETWORK EXPERIENCE RATING SYSTEM AND METHOD

FIELD OF THE INVENTION

This invention pertains to the computer networking art, and more particularly to a method and system for rating a network experience based upon the user's connection type and network usage.

BACKGROUND OF THE INVENTION

As the use of computers has become increasingly widespread in home and business environments alike, the need to interconnect such computers has also become important. For example, in a home environment, a user may be connected to a home network, such as a wireless network including, for example, one or more computers and perhaps one or more peripheral devices as well. Alternately, the user may be connected to a wide area network (WAN), such as the Internet. Similarly, in business contexts, users often use networks to communicate both internally within the business as well as externally to customers, suppliers, etc. Indeed, computer networking is fast becoming the enabling technology for the next-generation personal computer experience as multi-media, connected or smart home, peer-to-peer, and collaboration technologies emerge and develop.

Computer networking, however, is often perceived as a technology that can be difficult to comprehend and is rampant with quality fluctuations in network connectivity. Unfortunately, it is now difficult, if not impossible, to measure and visualize the health status of a computer network, particularly from the standpoint of a user experience with the network. The best indicator of connection quality is often user interpretation of how long it is taking to access a particular network resource and whether the connection is taking longer than usual. This is obviously a subjective and inaccurate way to determine the quality of a particular network connection. Thus, there is currently no reliable way for a user to evaluate his/her network connection.

Known network rating systems require a user to download software for evaluating the network connection between the user's computer and a particular website. In this scenario, software is running on both the website computer and the user's computer. This software creates additional network traffic for a given period of time to evaluate the connection between the two computers. While it may be useful in evaluating the connection between the user's computer and a particular website, this type of evaluation tool cannot convey information about the user's connection to any other network node. Furthermore, it only provides the user information about the connection at a discrete point in time.

Moreover, such rating systems do not adequately provide information relevant to the user's actual networking experience. Users typically access a limited number of resources during any given network session. Thus, the user's connection to a test website may provide little, if any, information about his/her connections to other remote destinations that are actually used. Finally, since the user is given no indication of how distant the particular network computer is from the user's computer, the user is provided with no information regarding what his/her connection might be like for another network resource that is closer or farther away. Another drawback of such methods is its active and obtrusive nature. Typically, a large amount of test packets need to be generated in order to accurately determine the quality of a user's connection to that test website, thus creating a relatively large drain on system resources. The result is that the information provided by current network experience programs is not particularly useful for evaluating a user's network connection to any given network resource at any given time.

In other technology areas, such as wireless phone and data technologies, a visual meter is often used to indicate the strength of a signal. Due to the diversity and complexity involved in computer network connectivity, however, providing an indicia of what defines the quality of a computer network connection remains a challenging issue.

BRIEF SUMMARY OF THE INVENTION

The invention provides a system and method for passively monitoring a network connection established by a user's computer. Based on data obtained from analyzing data traffic sent and received through the connection, a network experience profile for the user is created. The network experience profile includes information that is statistically analyzed and compared to data corresponding with current network connections. The network experience profile and the corresponding statistical data define ranges of normal and abnormal network experiences based on the user's network habits and network connection type.

In one embodiment, separate profiles are maintained for different connection types and different network distances. The system utilizes these various network traits to create multiple network profiles that enable a user to reliably perceive changes in network connection performance regardless of connection type or distance.

These and other advantages of the invention, as well as additional inventive features, will be apparent from the description of the invention provided herein and upon reference to the drawings.

DETAILED DESCRIPTION OF THE INVENTION

Figure 1:
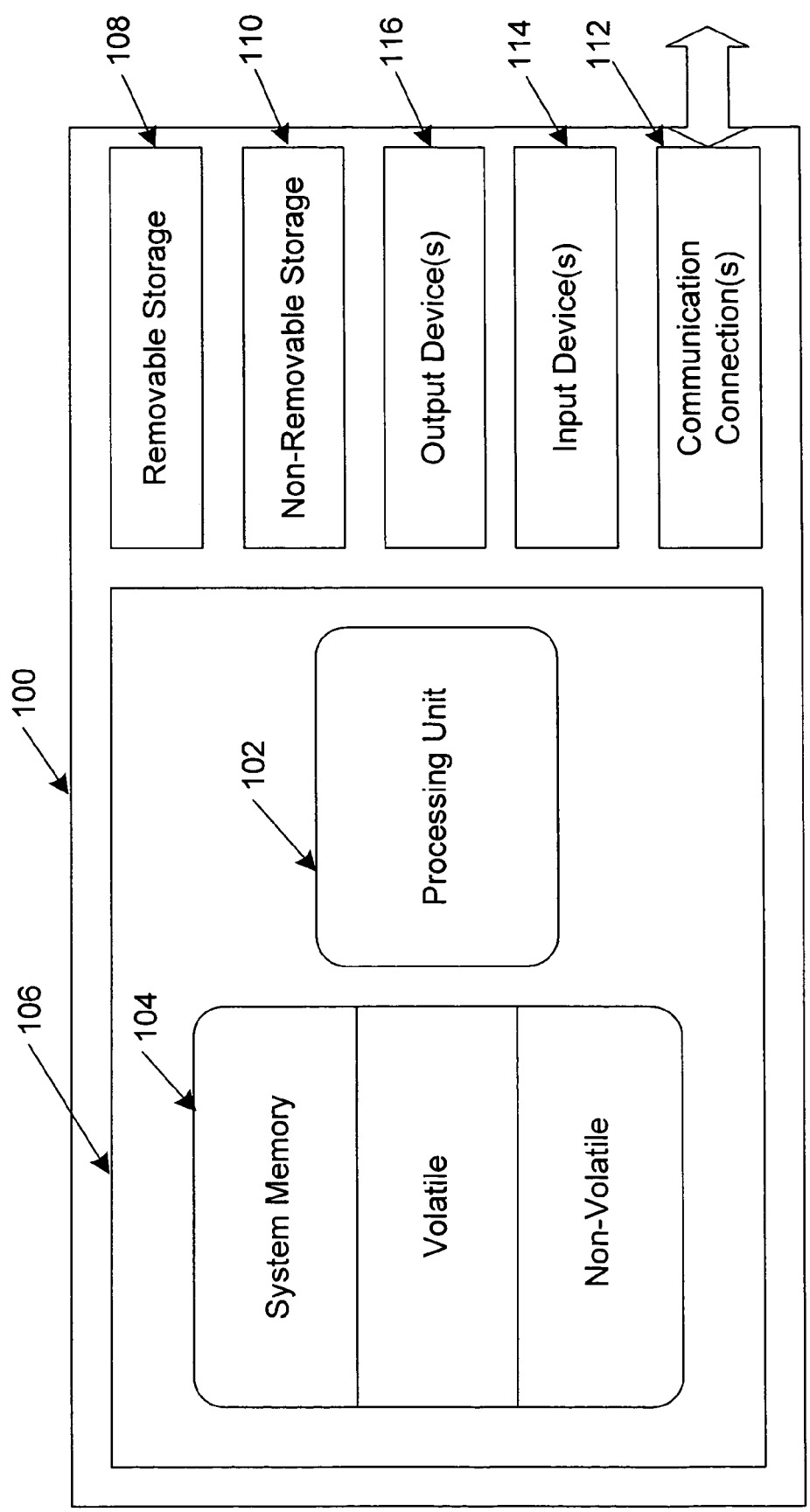
FIG. 1 is a simplified block diagram of a computing device.

Turning to the drawings, FIG. 1 illustrates a computing device 100. The computing device 100 includes a processing unit 102 and memory 104 on a motherboard or main body 106. Computing device 100 may include a variety of computer readable storage media. Computer readable storage media can be any available media that can be accessed by computing device 100 and includes both volatile and non-volatile media in memory 104, as well as removable 108 and non-removable 110 media implemented in any method or technology for storage of information such as computer readable instructions, data structures, program modules or other data. Computer readable storage media includes tangible computer readable storage media such as RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to tangibly store the desired information and which can accessed by computing device 100. Combinations of the any of the above should also be included within the scope of computer storage readable media. The computing device 100 may have input devices 114 such as a keyboard, mouse, touch pad, and touch screen and/or output devices 116 such as a display. Finally, the computing device 100 includes communication/network connections 112 to other devices, computers, networks, servers, etc. using either wired or wireless media. All these devices are well known in the art.

The invention may be described in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

For simplicity, embodiments of the invention are described herein in the context of a personal computer. One of ordinary skill in the art, however, will recognize that the invention is applicable to any suitable computing device 100. For example, embodiments of the invention may be applied to, but are not limited to, server computers, hand-held or laptop devices, multiprocessor systems, microprocessor-based systems, programmable consumer electronics, minicomputers, mainframe computers, distributed computing environments that include any of the above systems or devices, and the like.

Generally, the invention passively monitors a user's network experience by analyzing data traffic in a network connection established by the user's computer. Characteristic data such as packet latency and time to live values may be obtained and are statistically analyzed. Based on the data and the corresponding statistical analysis performed, the invention defines a normal network experience for the user based on the user's network habits and network connection type, thus providing reliable and individualized network experience information to the user.

The system thus takes into account the constraints of the user's computer to more accurately present the network performance at a given time and thereby provide a relative indication of performance. For example, a user may establish Internet connectivity via a dial-up connection. Dial-up connections generally have a lower bandwidth than many other types of connections, which can result in a negative impact on packet latency. Thus, dial-up connections are significantly slower than many other types of Internet connections, such as digital subscriber line (DSL), cable modem, or other broadband networks, for example. Any comparison of the overall performance of a dial-up connection with benchmarks that are more consistent with a DSL or cable connection would almost always result in the user being informed that they have a poor connection. Unlike the illustrated embodiment, such a comparison lacks context as it cannot present nuances in the user's own dial-up connection. At any given time, a dial-up user's connection speed may be different, which may have a relatively negative or positive impact on latency. In comparison to one another, a 56 kbps connection may result in generally excellent latency measurements, a 28.8 kbps connection may result in generally average latency measurements, and a 14.4 kbps connection may result in generally poor latency measurements for a given dial-up user. In comparison to a typical DSL or other higher speed connection, however, all of the dial-up packet latency measurements and/or data transmission rates may be relatively poor.

The rating system according to an embodiment of the invention also takes into account the user's Internet browsing tendencies. For example, a first user may frequently visit websites that are accessed through servers located in other parts of the world. Other users may frequently visit local sites. The rating system provides a relative indication for connectivity with respect to topological distance. Thus, the user may discern nuances in current near and/or far connection quality.

Figure 2:
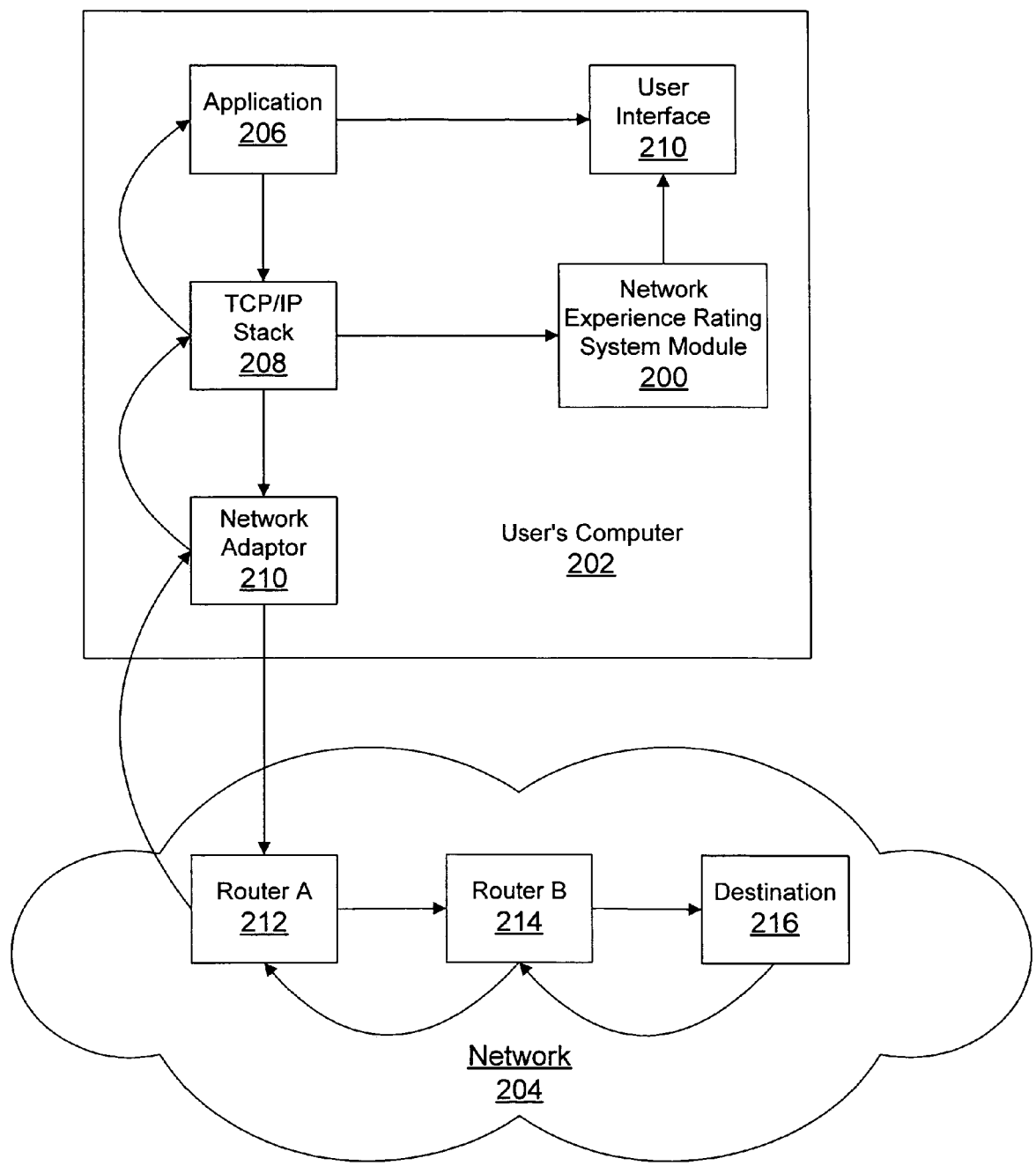
FIG. 2 is a block diagram illustrating a user's computer connected to a network.

FIG. 2 shows a simplified diagram representing interaction between the user's computer 202 and a network 204. A user instantiates one of any number of applications 206, such as an Internet web browser, to establish a connection with a destination address 216, which may be a server storing a desired website. The application passes data to the TCP/IP stack 208, which in turn sends one or more packets to a network 204 via a network adaptor 210. The network 204 comprises a plurality of routers 212, 214 that route packets to a desired destination 216. The destination 216 may send one or more packets in response to the one or more packets received at the destination 216. The one or more packets once again may be passed through routers 212, 214 in the network 204 to reach the user's computer 202. One of ordinary skill will appreciate, however, that the one or more packets may not and oftentimes will not traverse the same path of routers as the one or more packets sent to the destination 216. The packets are received at the network adaptor 210 and interpreted at the TCP/IP stack 208. The application 206 then retrieves the necessary information from the TCP/IP stack 208 to load the desired website and present it to the user via a user interface 210.

Similarly, the network experience rating system module 200 retrieves characteristic information about the transmission performance of the packets from the TCP/IP stack 208. Information retrieved by the network experience rating system 200 may include information such as round trip time (RTT) and time to live (TTL) values for a given packet. Although embodiments of the invention are generally described as rating a network experience based on packet latency or RTT and using TTL values to calculate hop count, one of ordinary skill in the art would appreciate that the rating system may utilize alternate network metrics, such as data transfer rate, to determine a user's network experience.

Round trip time or packet latency for TCP packets is measured from the time that a packet is sent with a particular sequence number until an ACK packet that covers that sequence number is received at the user's computer 202. The TTL is a value that is set in a TCP packet by the sender of the packet. The TTL value is initially set as an upper limit for the maximum number of hops that the packet should be allowed to take before it is discarded. For each router 212, 214 that the packet passes through, the TTL value is decremented by one. If a packet reaches a router 212, 214 having a TTL value of zero, then the router 212, 214 will not forward the packet on any further. As described in more detail below, the network experience rating system module 200 analyzes the information received from the TCP/IP stack 208, uses this information to determine the user's network experience, and may present the network experience to the user via a user interface 210 on the user's computer monitor or other display device.

Figure 3:
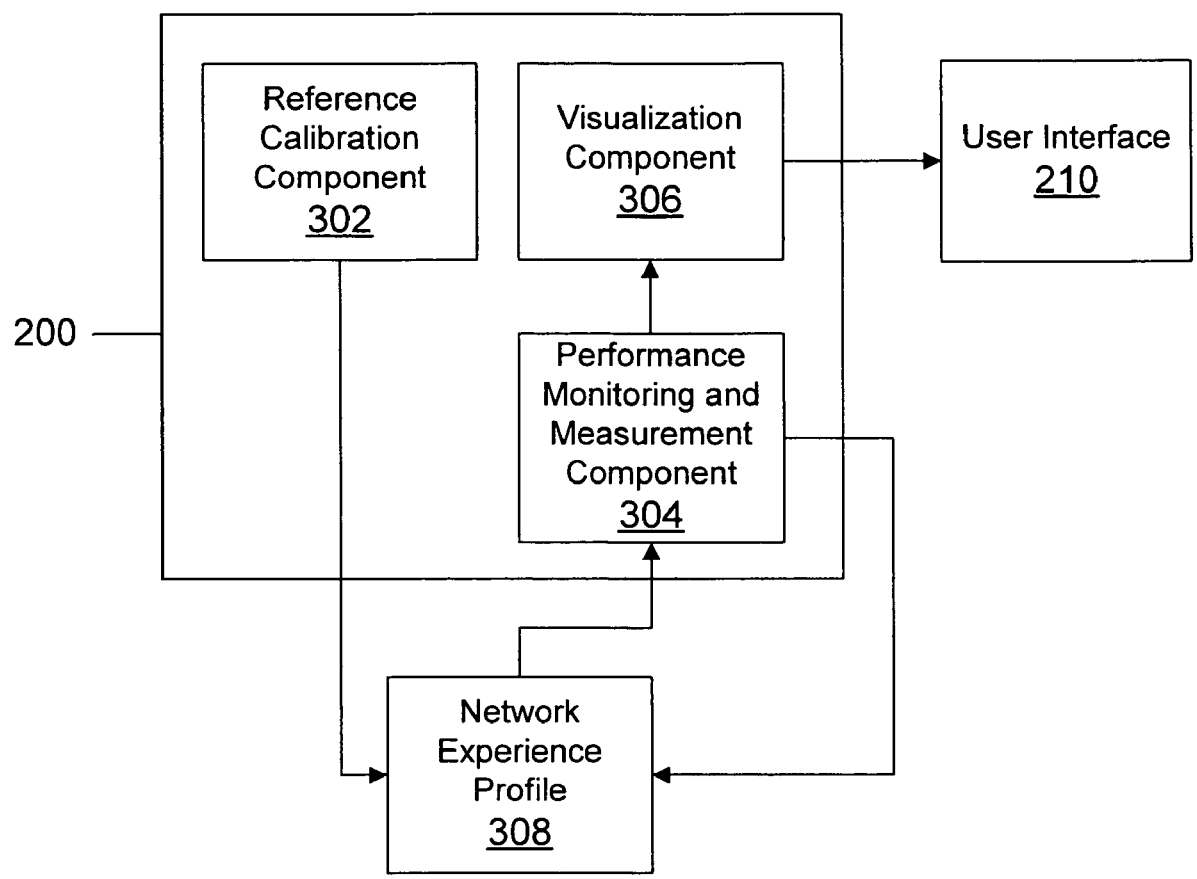
FIG. 3 is a block diagram showing a network experience rating system module in accordance with an embodiment of the invention.

FIG. 3 shows a network experience rating system (NERS) module 200 in accordance with an illustrated embodiment of the invention. The NERS module 200 comprises a reference calibration component 302, a performance monitoring and measuring component 304, and a visualization component 306. The reference calibration component 302 creates an initial set of network experience profile data 308. The performance monitoring and measurement component 304 performs various operations to generate the profile data 308. For example, this component analyzes open TCP/IP connections, and compares the computer's current connection to a set of network experience profile data 308 to determine the quality of network connection. In addition, this component updates the profile data 308, and performs calculations on the profile data 308. The visualization component 306 communicates with a user interface 210 to present the user's current network experience to the user.

When a network experience rating system module 200 is initially installed on a user's computer 202, the module 200 is unaware of the user's connection type or browsing habits. Therefore, the network experience rating system module may be provided to a user with a set of benchmark or profile data 308 to use until data specific to the user's computer 202 is gathered and applied. This benchmark data may be provided by the software provider and may represent a set of average latencies for different connection types accessing network resources at a variety of different hop counts. Preferably, this benchmark data would represent the results of a series of tests using a plurality of different computers to attempt to provide an acceptable median set of performance values for each network type suitable for providing a generally applicable initial set of data to a plurality of different computers.

To provide a more accurate set of initial data, the reference calibration component 302 of the NERS module 200 may allow the user to create their own set of initial network profile data during installation of the network experience rating system module 200 during network setup and/or at any other time initiated by the user. This data may be collected by the network experience rating system module 200 by making multiple access attempts to TCP connections at a variety of different hop counts away from the user's computer 202. Once a sufficient amount of data is gathered to provide a starting point for comparison purposes, this active data gathering may be ended, and the user's computer may begin or continue to monitor TCP packets passively without user interaction as described in more detail below.

Latency times or RTT's to access websites that are located on a server that is topologically distant from the user's computer 202 are typically longer than latency times for websites that are topologically closer to the user's computer 202. Generally, this is often because any packets sent to a server that is topologically distant from the user's computer 202 will need to travel a farther distance and/or be routed more times than sending packets to a server that is topologically closer to the user's computer. Thus, in order to provide a network profile 308 that takes into account the topological distance that a packet travels, a separate profile of data 308 may be kept for various hop count range groups. The number of profiles and hop count cutoff ranges for groups may be determined by the user, by the software provider, and/or by the reference calibration component 302.

One preferred embodiment utilizes three different hop count groups. One group is designated for packets sent within local subnets or otherwise relatively close to the user's computer 202 and may contain data for packets having a hop count of any value between zero and five, inclusive. This group is referred to as a local subnet group. Another group may contain data for near networks having a hop count between six and fifteen, inclusive. This group is referred to as the near network group. The third and final group in this example contains data for packets having a hop count greater than fifteen. This group typically includes data that is topologically distant from the user's computer 202 and may be located in other parts of the world. This group may be referred to as the foreign network group. One of ordinary skill in the art would appreciate that the number of hop count ranges/groups may be any suitable number. Also, the hop count ranges may have any suitable cutoff points and, thus, may be of any suitable range.

Figure 8:
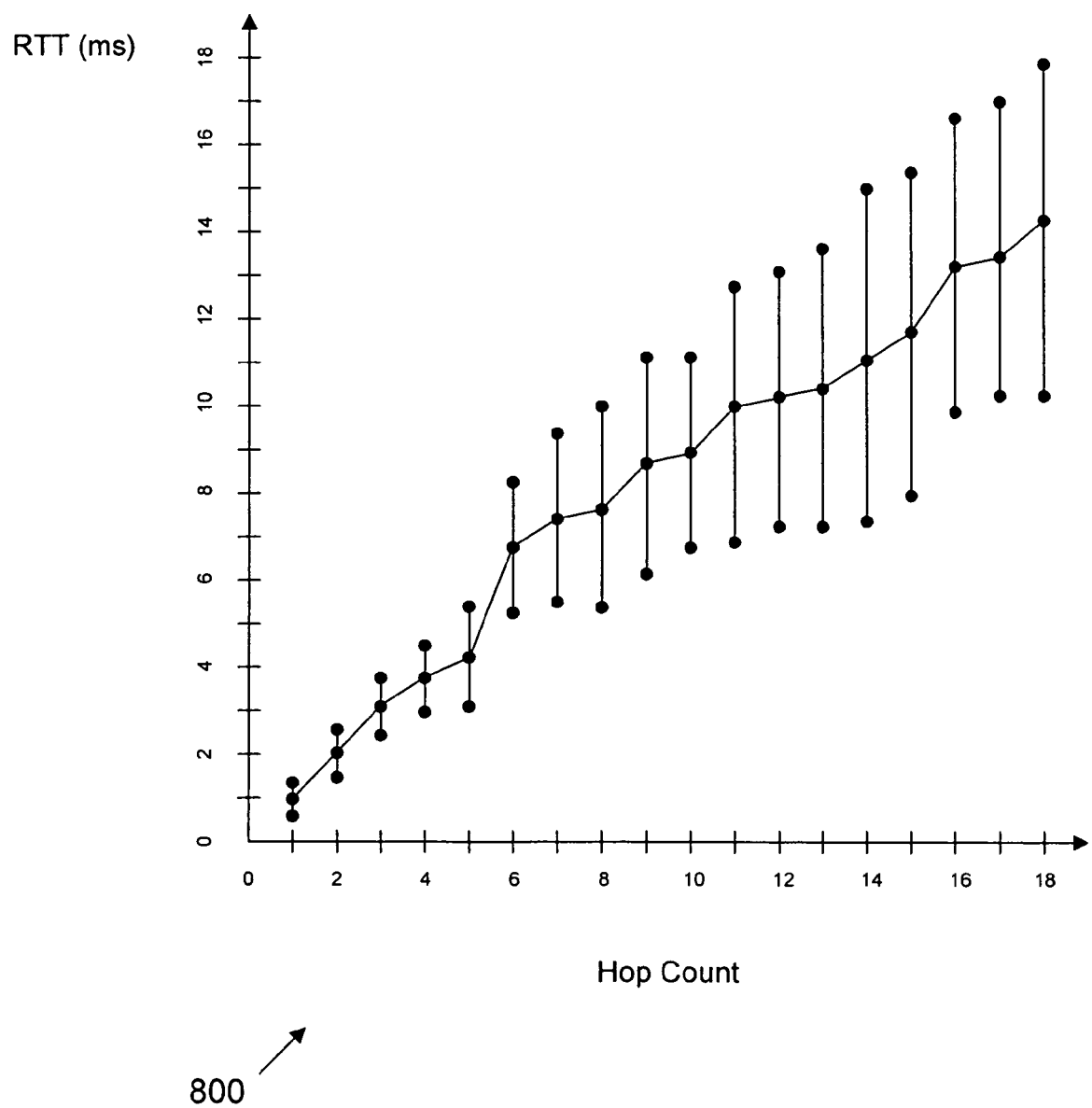
FIG. 8 is a two-dimensional graph representing sample data of a network experience profile.

As mentioned above, the number of profiles or hop count groups may be determined by the user, by the software provider, and/or by the reference calibration component 302. The user or the reference calibration component 302 may decide, for example, to set a hop count range cutoff for a group at points, based on the user's network experience profile 308, where there is a relatively large increase in latency time between consecutive hop counts. Referring to FIG. 8, which represents an example set of network experience profile data in graphical form, a relatively large jump in RTT occurs between hop counts five and six. Using this information, it may be desirable to have a hop count group from zero to five inclusive such that data for hop counts that are greater than five do not affect the mean RTT value for hop counts of five and lower. Alternately, a user may decide to manually set a hop count range cutoff for a group at a certain number of hops for other reasons. By way of example and not limitation, if a user's computer 202 is connected to a proxy, the user may want to set the group cutoff point at the proxy. Thus, a user can keep track of his/her performance within the proxy and outside the proxy separately. For example, if the user knows that a proxy is located at five hops, then the user may decide to set profile/group to contain data for hop counts between zero and five inclusive.

Figure 7:
FIG. 7 is a data structure representing an example of a network experience profile.

As explained below, the initial set of network experience profile data is replaced over time to conform to the user's own network usage. The benchmark data and the profile data may be stored within a data structure 700 such as shown in FIG. 7. The data structure may be a list, table, database, or any other suitable data structure. The data may comprise network performance information such as RTT times including minimum and maximum RTT times, TTL values, hop counts, mean RTT time, standard RTT deviation, data transfer rate, other suitable network performance information/measurements, and/or other suitable statistical values for the data.

Figure 4:
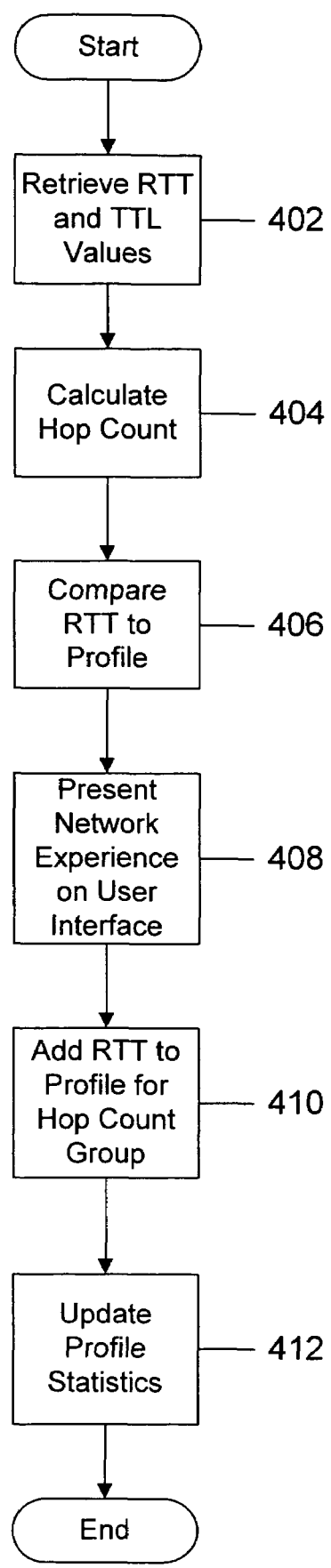
FIG. 4 is a flow diagram for a network experience rating system in accordance with an embodiment of the invention.

FIG. 4 shows a flow diagram of a method for monitoring a user's network experience in accordance with an embodiment of the invention. In step 402, the NERS performance monitoring and measurement component 304 retrieves RTT and TTL values from the TCP/IP stack for a data packet received by the user's computer 202. The hop count for the packet is calculated in step 404. To calculate the hop count, the TTL value is subtracted from the initial TTL value set by the computer that sent the packet. Often the actual TTL value set by the originating computer is unknown. Accordingly, the actual TTL value set by the originating computer may be estimated using the following table:

TABLE 1

| TTL range (inclusive) | TTL upper-limit |
|---|---|
| 0-32 | 32 |
| 33-64 | 64 |
| 65-128 | 128 |
| 129-255 | 255 |

If the TTL value is between 0 and 32, inclusive, then the upper-limit or originally set TTL is assumed to be 32. If the TTL is between 33 and 64, inclusive, then the upper-limit or originally set TTL is assumed to be 64, and so forth. Although, this is only an estimate of the original TTL value set by the sender of the packet, it is relatively reliable because most packets will take 32 hops or less to reach a destination. Also, as described below, certain RTT times will be discarded if they stray too far from the average for a given hop count or hop count group. One of ordinary skill in the art would appreciate that a hop count for a packet may be determined or estimated by any suitable method.

After the hop count is calculated, the RTT is compared to the profile for the group in which the hop count falls, as shown in step 406. For example, the NERS module 200 may be configured to determine, based upon this comparison, whether the network experience is good, normal, or poor. As an example, this may be determined using Table 2 below. If the current network experience RTT time is less than two times the standard deviation below the mean of the profile data 308, then the network experience is considered good. On the other hand, if the current network experience RTT time is greater than two times the standard deviation above the mean for the profile data 308, then the network experience is considered poor. If the current network experience falls between two times the standard deviation below the mean and two times the standard deviation above the mean, then the network experience is considered normal in this example. One of ordinary skill in the art would appreciate that alternate criteria may be used to determine network experience and that alternate quantities of experience ratings (other than good, normal, and poor as described above) may be determined and provided to a user.

This statistical analysis may be further explained in the following example. Assuming that the mean RTT for the group is 6 ms, the current RTT is 1 ms, and the standard deviation is 2 ms, the current RTT deviation from the mean is the current RTT minus the mean RTT. This calculation yields −5 (1 ms−6 ms=−5). −5 is less than −4 (−2*2 ms), so using Table 2 below, the connection is considered good. If the current RTT time is 6 ms, then the deviation from the mean RTT is 0 (6 ms−6 ms=0). 0 falls between −2 times the standard deviation (−2*2 ms=−4) and +2 times the standard deviation (+2*2 ms=+4), so the connection is considered normal. Finally, assuming that the current RTT time is 12 ms, then the deviation from the mean RTT is 6 ms (12 ms−6 ms=6 ms), which is greater than +2 times the standard deviation (+2*2 ms=4). Therefore, a current RTT time of 12 ms is considered poor in this example. Once the comparison is complete, the visualization component 306 may present the results to the user via a user interface 210 in step 408.

TABLE 2

| Tick Count | Current RTT Deviation From Mean RTT |
|---|---|
| 3 (good) | <−2 * standard deviation |
| 2 (normal) | −2 * standard deviation < and <+2 * standard deviation |
| 1 (poor) | >+2 * standard deviation |

In step 410, the current RTT value is added to the profile 308 for the corresponding hop count group to update the network experience profile. Alternately, it may be desirable to discard certain RTT values instead of adding them to the profile 308 to avoid sporadic bad connections adversely impacting the profile. Thus, for example, the NERS may discard RTT values that are more than two standard deviations above or below the mean RTT for the profile 308. One of ordinary skill in the art would appreciate that the NERS may be configured to discard data based upon any suitable criteria desired by the user and/or the software provider.

The statistics may then be updated in step 412 for the group profile 308 that was updated with the new RTT in step 410. As mentioned above, the profile 308 may store information such as measured RTT times corresponding with hop counts, the minimum and maximum RTT time for each hop count and/or group, the mean RTT time for each hop count and/or group, and/or the standard deviation for each hop count and/or group. In order to accurately represent the current RTT times with respect to the user's more recent network experiences, the mean RTT time maintained within the user's network experience profile 308 may be calculated as a moving average, which gives more weight to recent data than to older data. Alternately, older data may be removed from the calculation as new information is added to the profile 308, or data older than a certain amount of time may be discarded automatically by the NERS module 200. In this way, the NERS module 200 is able to take into account the user's network experience in comparison to the user's more recent network experiences. This may be important, for example, if new hardware is added to the user's computer 202 or network 204 that improves the overall network experience by the user. Assuming that the user does not use the reference calibration component 302 to run a manual runtime reference data update to create a new profile 308 once the new hardware is updated, the network experience profile 308 will eventually adjust over time to accurately represent the user's network experience with the improved performance.

Thus, the network experience rating system module 200 operates passively on the user's computer without user interaction or a corresponding set of software on the destination computer 216. Furthermore, the NERS module 200 rates the user's network experience based upon the user's own network connection type and based upon the particular TCP connections opened by the user's computer 202 thereby providing reliable and user specific network experience results.

It may be desirable in certain embodiments to use small sampling windows for collecting data before performing the steps above, instead of updating the profile 308 every time that data is retrieved for a new TCP connection. Thus, in step 410, the NERS module 200 may retrieve information from the TCP/IP stack for a given period of time (e.g., five seconds), calculate the hop count for each RTT value to determine the appropriate group, and average the RTT times for each group. This average RTT time for this small sampling window may then be compared to the user's profile 308 in step 406.

The NERS module 200 may maintain a separate set of network experience profiles 308 for different connection types such that faster or slower connection types do not skew the NERS results for other connection types (e.g., DSL, cable, dial-up, ISDN, T1, etc.). Certain users may utilize more than one connection type on a single computer. A user may usually utilize a connection such as DSL, but occasionally when the DSL network is down, the user may need to switch to dial-up in order to connect to a network. As another example, a user may connect his/her laptop computer via dial-up at home, but connect wirelessly or via a T1 connection at work. The NERS module 200 may recognize automatically or the user can manually adjust the NERS module 200 when the user switches connection types. Therefore, the NERS module 200 will use the correct network experience profile 308 for a given connection type.

Figure 5:
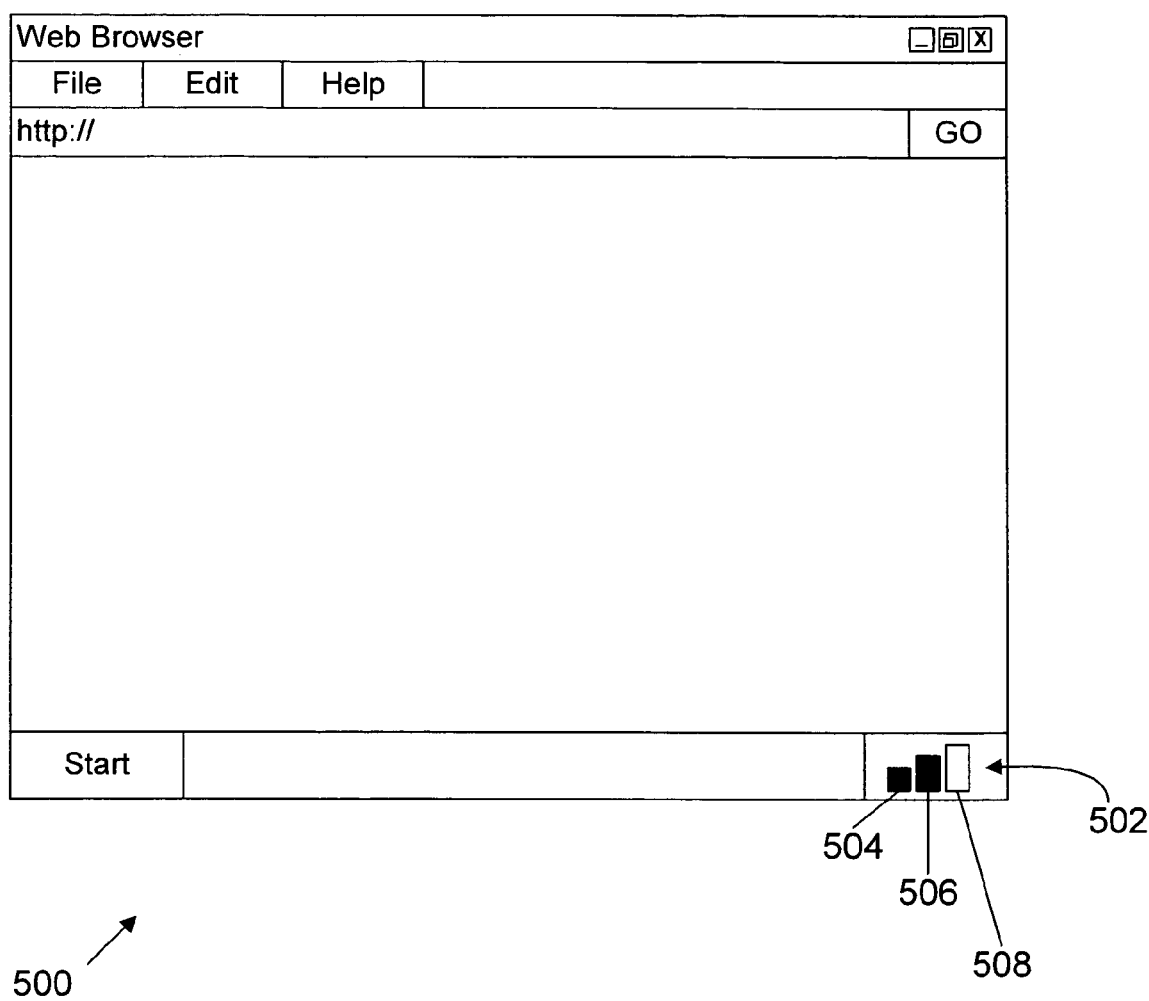
FIG. 5 is an example of a graphical user interface displaying a network experience rating.

In certain embodiments, the NERS module 200 may be able to identify when network connectivity is lost. On a user interface 502 such as shown in FIG. 5, this may be represented by all of the status bars being empty. To determine if a network connection has been lost, using the example of three different hop count groups for local, near, and foreign networks, a separate counter is maintained for each group. If, during the sampling window, all outgoing TCP connections are waiting for acknowledgement and have sent a certain number of retransmissions, these counters will be incremented. In the next sampling window, if some acknowledgments are received by the TCP/IP stack 208, the NERS module 200 will perform one of several actions. If there are no more unacknowledged outgoing TCP connections with a certain number of retransmissions, then all of the counters are reset. If there is an acknowledgement from a connection in the local subnet group, then the counter for the local subnet is reset and the other counters are incremented. Further, if there is an acknowledgment from a connection in the near network group, the counter for both the local subnet and the near network are reset, but the counter for the foreign network is incremented. Finally, if there is an acknowledgment from a connection in the foreign network group, then all of the counters are reset. If a counter reaches a user or software provider's predefined threshold (e.g., three), the NERS module 200 will determine that connectivity is broken for the corresponding group. For example, if the near network counter reaches three, then connectivity has been lost to near networks (e.g., those having a hop count between 6 and 15, inclusive). If connectivity is lost to near networks, then it is also lost to the foreign networks. Similarly, if connectivity is lost for local networks, then connectivity is also lost for both near and foreign networks.

The NERS module 200 may be used to provide the user with a general sense of the user's connection type in relation to the user's typical latency times. Additionally, the NERS module 200 may be used to determine where network problems may be occurring on the network. For example, if the user has connectivity to local networks (e.g., inside a proxy), but has lost connectivity to near and foreign networks, then the user knows that the network problem is probably not at the user's computer 202. Instead, the user's computer 202 may be blocked from operating outside the proxy by a firewall, or the connection between the proxy and outside networks may be down. Similarly, the user may recognize that a problem may be occurring at the user's computer 202 if there is no connectivity to local, near, or foreign networks. Knowing where a network problem is likely occurring, the user can troubleshoot the problem more quickly to attempt to reestablish connectivity.

Although the invention is described in terms of TCP/IP protocol, one of ordinary skill in the art would appreciate that it is applicable to any suitable multinetwork protocol, such as IPv4, IPv6, IPX, etc.

The following example further illustrates the invention but, of course, should not be construed as in any way limiting its scope. Referring again to FIG. 2, assume for purposes of this example, that a user is attempting to connect to a website located on destination server 216 via an application 206 running on the user's computer 202, such as an internet browser. Also assume that the user's computer 202 is using a DSL connection. Utilizing the TCP/IP stack 208 and the network adaptor 210, the user's computer 202 attempts to establish a connection with the destination server 216 by sending a packet into the network. The packet reaches Router A 212, which forwards the packet onto Router B 214. Router B 214 then forwards the packet to the destination server 216. The destination server 216 sends a packet in return back to the user's computer 202. The destination server 216 sets a TTL value for the packet before the packet is sent. For this example, the original TTL value set by the destination server 216 is 64. The return packet passes through Router B 214, which forwards it onto Router A 212 and decrements the TTL value to 63. Router A 212 receives the return packet, forwards the return packet to the user's computer 202, and decrements the TTL value to 62. The packet is received by the user's network adaptor 210 and interpreted by the TCP/IP stack 208. The browser application 206 retrieves some of the packet's information from the TCP/IP stack 208. Similarly, the network experience rating system module 200 may retrieve the TTL value for the packet and the RTT, which is the time between the TCP/IP stack 208 sending the first packet to the destination server 216 and the time that TCP/IP stack 208 receives a response from the destination server 216. For purposes of this example, the RTT will be assumed to be 4 ms.

Once the NERS module 200 has the TTL and RTT values, the performance monitoring and measuring component 304 calculates the hop count for this packet. The hop count is equal to the original TTL value set by the destination server 216 minus the TTL value contained in the packet when it is received by the user's computer 202. In many instances, the user's computer 202 does not know the original TTL value, so Table 1 may be used to approximate this value. Using Table 1, the TTL upper limit used is 64 (which happens to be the value set by the destination server 216, but this may not always be the case). Thus, the hop count is equal to 64 minus 62, which yields a hop count equal to two. Knowing the hop count and the connection type, the NERS module 200 can determine the network profile 308 to which the RTT time should be compared and potentially added.

Using the example groups described above, the NERS module 200 can determine that connections with a hop count of two fall within the local subnet group, and thus should be compared with the long-term local subnet profile (or initial benchmark data supplied by the software provider or created by the performance calibration component if a profile has not yet been created). The NERS module 200 will have already been configured or will detect that the user is using a DSL connection, so the NERS module will know that the RTT for the current packet should be compared to the long-term local subnet profile for a DSL connection. At this point, the performance monitoring and measurement component 304 has either previously calculated and stored the mean RTT time and standard deviation and will retrieve the standard deviation from the network experience profile 308, or the performance monitoring and measurement component 304 will use the profile data 308 to calculate the mean RTT and standard deviation for the local subnet DSL group. The RTT for the currently received packet may then be compared to the mean RTT and standard deviation according to Table 2, or according to any other suitable criteria for categorizing a network experience.

Assuming that the mean RTT is 6 ms and standard deviation is 2 ms, an RTT of 4 ms is within two standard deviations of the mean. Thus, using Table 2, the connection is considered normal. This result may then be displayed on a user interface 210 such as the user interface 502, 602 shown in FIGS. 5 and 6, respectively. The RTT of the packet may then be added to the network experience profile 308. Once the RTT is added to the profile 308, the mean and standard deviation may be updated.

Figure 6:
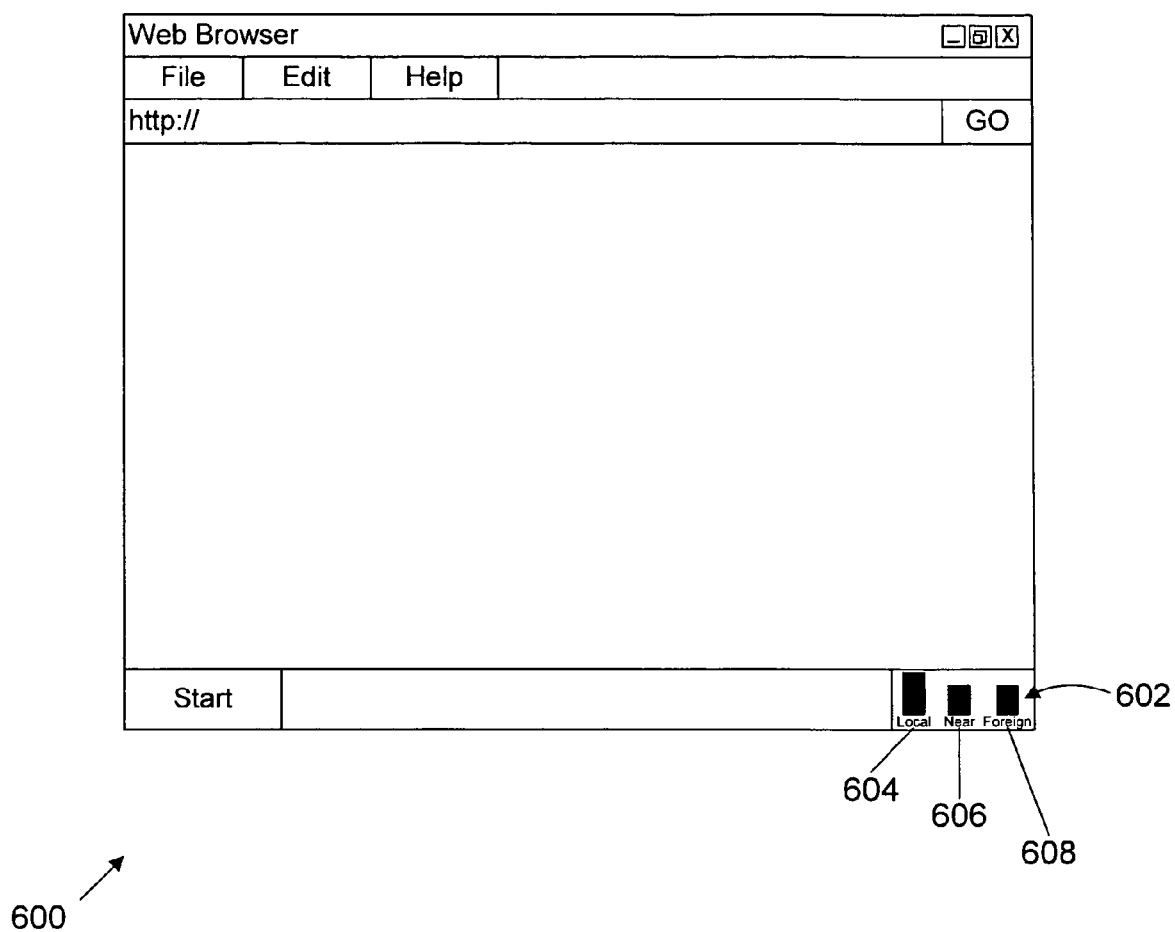
FIG. 6 is another example of a graphical user interface displaying a network experience rating.

An example of a user interface 502 is shown in FIG. 5. As shown, the user interface 502 may have three bars 504, 506, 508 that represent the user's network experience. In this example, if the first bar 504 is the only bar that is colored in, then the network experience is poor. If the first bar 504 and the second bar 506 are filled in, as shown in the figure, then the network experience is normal. Finally, if all three bars 504,

506, 508 are filled in, then the network experience is good. In this embodiment, one user interface 502 is provided to represent the entire network experience regardless of the number of hop count groups, e.g., local, near, foreign, etc. If the user has open connections to destinations falling into different hop count groups, the user interface 502 may, for example, average the performance across all the hop count groups for presentation on the user interface. Alternately, the NERS user interface could have a separate bar for each hop count group, local, near, and foreign. The relative height of each bar 604, 606, 608 depicts the network experience for any current TCP connections falling within a respective group. An example of this type of user interface 602 is shown in FIG. 6. The first bar 604 indicates the user's network experience for the local network, the second bar 606 represents the user's network experience for the near network, and the third bar 608 represents the user's network experience for the foreign networks. As shown, the user's connection to the local network is good, and the user's connections to the near and foreign networks are normal. By way of example and not limitation, the NERS results may be presented to the user via a variety of suitable user interfaces, such as one or more bars, using one or more colors, using different icons, using icons of various sizes, 2D or 3D graphs, spreadsheets, taskbar items, dialogue boxes, etc. One of ordinary skill in the art would appreciate that the user's network experience may be presented to the user in any suitable manner.

As a further example, given that the NERS module 200 is passive in nature, there are periods of time when there is insufficient network traffic to accurately display a current network experience. When this occurs, the visualization component 306 may still relay the most recent network experience rating, yet at the same time, indicate network inactivity to the user. This may be accomplished by visually dimming the NERS user interface 210. For example, the first phase of visual change may be the conversion of the NERS user interface 210 from color to a grayscale color scheme. The user interface 210 may continually become less gray over time until some predetermined limit is reached. If a network connection becomes active again, the user interface 210 may revert back to its colored form and reflect the updated NERS rating.

FIG. 8 shows a graphical representation 800 for a set of network experience profile data. The graph plots hop count versus mean RTT. Each middle point in the vertical lines in the graph represent a mean RTT for a corresponding hop count. Using the example described above and Table 2, the vertical lines represent a distance of four standard deviations. A distance of two standard deviations is shown above the mean point and two standard deviations are shown below the mean point. If each hop count is considered a separate group for comparison purposes, then a measured RTT value falling within the vertical line is normal. If the RTT is higher than the highest extent of the vertical line for the hop count, then the network quality is poor. Finally, if the RTT is lower than the lowest extent of the vertical line for the hop count, then the network quality is good.

Accordingly, a network experience rating system and method that provides a visual indicator of quality of a network connection, specific to a user's hardware and software configuration as well as personal use habits, has been described herein. The invention may be used in conjunction with other network configuration and/or diagnostic technologies to improve a user's networking experience.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A tangible, computer readable storage medium having computer executable instructions for rating computer network connectivity on a client computer of a user, the computer executable instructions performing steps comprising:

creating, at the client computer, an initial user network experience profile specific to the user of the client computer and a network connection type, the initial user network experience profile including at least one of:

initial round trip latency information gathered from an initial set of multiple access attempts to selected multiple TCP/IP connections from the client computer via the network connection type, the selected multiple TCP/IP connections at a variety of different hop counts away from the client computer and the initial set of multiple access attempts gathered at the user's request; or benchmark profile data, the benchmark profile data provided by a provider of the computer executable instructions and including a set of average latency information obtained by the provider via a series of tests of accessing selected multiple network resources, via multiple network connection types at a plurality of different computers, at different hop counts from the plurality of different computers;

analyzing, at the client computer of the user, a TCP/IP connection to obtain current round trip latency information based on network browsing habits of the user and the network connection type;

performing, at the client computer, a statistical analysis on the obtained current round trip latency information to derive a value;

comparing, at the client computer, the derived value to reference statistical data derived from the initial user network experience profile, wherein comparing the derived valued to the reference statistical data comprises determining a proximity of the derived value to a mean of the reference statistical data;

determining, at the client computer, a performance rating of computer network connectivity specific to the user and the network connection type on the client computer based on the comparison, the performance rating being a relative indication of a category of performance; and updating the initial user network experience profile with the obtained current round trip latency information to create a current user network experience profile, wherein a different initial user network experience profile and a different current user network experience profile are created specific to each different user and network connection type pair.

2. The tangible, computer readable storage medium of claim 1 wherein the initial and the current network experience profiles are data structures.

3. The tangible, computer readable storage medium of claim 1, further comprising computer executable instructions for presenting the performance rating on a user interface.

4. The tangible, computer readable storage medium of claim 1, wherein analyzing, at the client computer, the TCP/IP connection to obtain round trip latency information comprises analyzing, at the client computer, the TCP/IP connection to obtain a time to live value and calculating a hop count using the time to live value.

5. The tangible, computer readable storage medium of claim 1 wherein the reference statistical data is chosen based upon a hop count.

6. The tangible, computer readable storage medium of claim 1 wherein the derived value is a mean round trip time and the reference statistical data comprises a reference round trip time.

7. The tangible, computer readable storage medium of claim 6 wherein determining the proximity of the derived value to the mean of the reference statistical data comprises determining a proximity of the mean round trip time to a mean of the reference round trip time.

8. The computer readable storage medium of claim 1, further comprising computer executable instructions for determining a current performance rating of computer network connectivity for the user and the network connection type at the client computer by repeating the analyzing, performing, determining and updating steps of claim 1, wherein:

the repeated analyzing step comprises analyzing, at the client computer, the TCP/IP connection to obtain newer round trip latency information based on the network browsing habits of the user and the network connection type of the client computer;

the repeated performing step comprises performing, at the client computer, a statistical analysis on the obtained newer round trip latency information to derive the value;

the repeated comparing step comprises comparing, at the client computer, the derived value to reference statistical data derived from the current user network experience profile, and the repeated updating step comprises updating the current user network experience profile with the obtained newer round trip latency information to create a newer user network experience profile.

9. The tangible, computer readable storage medium of claim 1, wherein the performance rating being the relative indication of the category of performance comprises at least one of:

the performance rating being a relative indication of a performance level, the performance level selected from a group of performance level categories having members corresponding to at least a poor performance level, a normal performance level, and a good performance level; or the performance rating being a relative indication of a performance of a hop count group, the hop count group corresponding to a range of values of a hop count and selected from a group of hop count groups including a local group, a near network group, and a foreign network group.

10. The tangible, computer readable storage medium of claim 1, wherein the relative indication comprises one of: a color, a different icon, a differently-sized icon, a bar, a dialogue box, or a task bar item.

11. The tangible, computer readable storage medium of claim 1, wherein a separate initial user network experience profile and a second separate current user network profile are created specific to each different user and network distance category, a network distance category corresponding to a range of values of a hop count.

12. A method for rating computer network connectivity for a user of a client computer, the method comprising:

at the client computer:

creating a set of initial user network experience profiles, wherein:

each of the set of initial user network experience profiles is specific to the user, a network connection type, and a hop count group, and each of the set of initial user network experience profiles includes at least one of:

initial round trio latency information gathered from an initial set of multiple access attempts to selected multiple TCP/IP connections from the client computer via the network connection type, the selected multiple TCP/IP connections at a variety of different hop counts in the hop count group away from the client computer, and the initial set of multiple access attempts gathered at the user's request; or benchmark profile data, the benchmark profile data provided by a provider of the computer executable instructions and including a set of average latency information obtained by the provider via a series of tests of accessing selected multiple network resources, via multiple network connection types at a plurality of different computers, at different hop counts in the hop count group from the plurality of different computers;

analyzing, at the client computer of the user, a TCP/IP connection to retrieve a round trip network performance measurement associated with a packet;

calculating a hop count for the packet;

selecting, based upon the hop count, a particular initial user network experience profile; and comparing the retrieved round trip network performance measurement to reference statistical data from the particular initial user network experience profile to measure a network experience rating specific to the user, the hop count group and the network connection type, wherein:

comparing the retrieved round trio network performance measurement to the particular initial user network experience profile comprises determining a proximity of the retrieved round trio network performance measurement to a mean of the reference statistical data, and the network experience rating is a relative indication of the determined proximity;

updating the particular initial user network experience profile with the retrieved round trip network performance measurement to create a particular current user network experience profile, wherein a different initial user network experience profile and a different current user network experience profile are created specific to each different combination of user, network connection type and hop count group.

13. The method of claim 11 further comprising adding the retrieved round trip network performance measurement to the selected set of network experience profile data.

14. The method of claim 11 wherein the retrieved round trip network performance measurement is at least one of a round trip time, a time to live value, and a data transfer rate.

15. The method of claim 12 wherein the retrieved round trip network performance measurement is at least one of a round trip time, a time to live value, and a data transfer rate.

16. The method of claim 11 wherein the mean value is a moving average.

17. The method of claim 11 wherein the selected set of network experience profile data is stored in a data structure.

18. A computer program product embodied on a tangible, computer readable storage medium for use in a client computer of a computing system adapted to monitor network connectivity of the computing system for a user of the client computer, the computer program product comprising:

a reference calibration component at the client computer for providing an initial network experience profile specific to a user of the client computer and a network connection type, the initial network experience profile including at least one of:

initial round trip latency information gathered from an initial set of multiple access attempts to selected multiple TCP/IP connections from the client computer via the network connection type, the selected multiple TCP/IP connections at a variety of different hop counts away from the client computer and the initial set of multiple access attempts gathered at the user's request; or benchmark profile data, the benchmark profile data provided by a provider of the computer executable instructions and including a set of average latency information obtained by the provider via a series of tests of accessing selected multiple network resources, via multiple network connection types at a plurality of different computers, at different hop counts from the plurality of different computers; and a performance monitoring and measurement component at the client computer for:

retrieving a round trip time associated with a data packet originated by the user on a given network connection type at the client computer, comparing the retrieved round trip time to reference statistical data derived from the initial network experience profile, comprising determining a measure of a proximity of the retrieved round trip time to a mean of the reference statistical data, determining a performance rating of computer network connectivity specific to the user and the given network connection type at the client computer based on the comparison, the performance rating being a relative indication of a category of performance, and updating the initial network experience profile with the retrieved round trip time to create a current network experience profile, wherein a different initial network experience profile and a different current network experience profile are created specific to each different user and network connection type pair.

19. The computer program product of claim 18 further comprising a visualization component at the client computer for retrieving the comparison from the performance monitoring and measurement component and providing the comparison to a user interface using an abstracted performance category corresponding to the comparison, wherein the relative indication comprises one of: a color, a different icon, a differently-sized icon, a bar, a dialogue box, or a task bar item, and wherein the relative indication of the category of performance comprises at least one of:

a relative indication of a performance level, the performance level selected from a group of performance level categories having members corresponding to at least a poor performance level, a normal performance level, and a good performance level; or a relative indication of a performance of a hop count group, the hop count group corresponding to a range of values of a hop count and selected from a group of hop count groups including a local group, a near network group, and a foreign network group.

* * * * *